(12) United States Patent
Limberg et al.

(10) Patent No.: US 8,230,607 B2
(45) Date of Patent: Jul. 31, 2012

(54) KEYLESS BLADE CLAMP FOR A POWER TOOL

(75) Inventors: Kurt Limberg, Milwaukee, WI (US);
Roger D. Neitzell, Palmyra, WI (US);
Michael S. Steele, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 479 days.

(21) Appl. No.: 12/463,241

(22) Filed: May 8, 2009

(65) Prior Publication Data

US 2009/0277022 A1    Nov. 12, 2009

Related U.S. Application Data

(60) Provisional application No. 61/051,834, filed on May 9, 2008.

(51) Int. Cl.
*B27B 19/09* (2006.01)
*B23D 51/10* (2006.01)
*B23B 31/07* (2006.01)

(52) U.S. Cl. ........... 30/392; 30/339; 83/699.21; 279/71; 279/81

(58) Field of Classification Search ............ 30/392–394, 30/339; 279/71, 81; 83/699.21
See application file for complete search history.

(56) References Cited

U.S. PATENT DOCUMENTS

| | | |
|---|---|---|
| 666,511 A | 1/1901 | Furbish |
| 1,341,085 A * | 5/1920 | Tarbutton ................... 279/66 |
| 1,484,393 A | 2/1924 | Hanson |
| 1,578,475 A | 3/1926 | Sideman |
| 1,597,240 A | 8/1926 | Marks |
| 2,049,898 A | 8/1936 | Driest |
| 2,101,362 A | 12/1937 | Davidson |
| 2,411,028 A | 11/1946 | Davies et al. |
| 2,539,574 A | 1/1951 | Fulmer |
| 2,565,344 A | 8/1951 | Benham |
| 2,735,685 A | 2/1956 | Karr |
| 2,895,514 A | 7/1959 | Wright |
| 3,024,032 A | 3/1962 | Nixon |
| 3,028,890 A | 4/1962 | Atkinson et al. |
| 3,114,402 A | 12/1963 | Jacoff |
| 3,259,158 A | 7/1966 | Garamy |
| 3,338,278 A | 8/1967 | Reuterfors |
| 3,360,021 A | 12/1967 | Mejia |
| 3,398,965 A | 8/1968 | Cox |

(Continued)

FOREIGN PATENT DOCUMENTS

DE    3713208    11/1988

(Continued)

*Primary Examiner* — Hwei C Payer
(74) *Attorney, Agent, or Firm* — Michael Best & Friedrich LLP

(57) ABSTRACT

A reciprocating tool that includes a spindle that reciprocates with respect to a housing within a cavity of the housing. The reciprocating tool includes a blade clamp mechanism actuator coupled to the housing for movement with respect the housing between first and second positions. The spindle reciprocates with respect to the blade clamp mechanism actuator. A blade clamp mechanism is coupled to the spindle for reciprocating movement therewith, and the blade clamp mechanism is configured to attach the saw blade to the spindle. The blade clamp mechanism includes a collar mounted on the end of the spindle, and the collar is rotatable about the longitudinal axis of the spindle between an engaged position and a disengaged position in response to movement of the blade clamp mechanism actuator between the first position and the second position.

31 Claims, 10 Drawing Sheets

U.S. PATENT DOCUMENTS

| | | |
|---|---|---|
| 3,412,767 A | 11/1968 | Green, Jr. |
| 3,521,686 A | 7/1970 | Weinmann |
| 3,528,463 A | 9/1970 | Mejia |
| 3,542,097 A | 11/1970 | Dudek |
| 3,555,678 A | 1/1971 | Agulnick et al. |
| 3,583,716 A | 6/1971 | Daniel, Jr. |
| 3,750,283 A | 8/1973 | Hoffman |
| 3,754,330 A | 8/1973 | Anderson et al. |
| 3,802,077 A | 4/1974 | Averitt |
| 3,802,079 A | 4/1974 | Ketchpel, Jr. et al. |
| 3,823,473 A | 7/1974 | Hoffman |
| 3,927,893 A | 12/1975 | Dillon et al. |
| 3,942,251 A | 3/1976 | Griffies et al. |
| 3,964,163 A | 6/1976 | Russo |
| 3,971,132 A | 7/1976 | Griffies et al. |
| 4,011,657 A | 3/1977 | Vance |
| 4,020,555 A | 5/1977 | Hedrick |
| 4,031,622 A | 6/1977 | Alexander |
| 4,083,112 A | 4/1978 | Palm |
| 4,106,181 A | 8/1978 | Mattchen |
| 4,137,632 A | 2/1979 | Pfanzer |
| 4,204,692 A | 5/1980 | Hoffman |
| 4,206,657 A | 6/1980 | Palm |
| 4,228,701 A | 10/1980 | Herpin |
| 4,238,884 A | 12/1980 | Walton, II |
| 4,240,204 A | 12/1980 | Walton, II et al. |
| 4,243,342 A | 1/1981 | Marto |
| 4,255,858 A | 3/1981 | Getts |
| 4,272,996 A | 6/1981 | Sauerwein |
| 4,285,129 A | 8/1981 | Hoffman |
| 4,294,013 A | 10/1981 | Krieg |
| 4,299,402 A | 11/1981 | Hoffman |
| 4,351,112 A | 9/1982 | Nalley |
| 4,355,557 A | 10/1982 | Mecsey |
| 4,377,909 A | 3/1983 | Kenner |
| 4,386,609 A | 6/1983 | Mongeon |
| 4,441,255 A | 4/1984 | Hoffman |
| 4,458,421 A | 7/1984 | Lew |
| 4,470,196 A | 9/1984 | Hoffman |
| 4,512,078 A | 4/1985 | Pfanzer |
| 4,516,324 A | 5/1985 | Heininger, Jr. et al. |
| 4,528,753 A | 7/1985 | Kuhlmann et al. |
| 4,533,337 A | 8/1985 | Schoeps |
| RE32,020 E | 11/1985 | Abel |
| 4,550,500 A | 11/1985 | Kuhlmann et al. |
| 4,550,501 A | 11/1985 | Moores, Jr. et al. |
| 4,553,306 A | 11/1985 | Mineck |
| 4,566,190 A | 1/1986 | Isakson |
| 4,577,875 A | 3/1986 | Miyakawa |
| 4,594,781 A | 6/1986 | Hoffman |
| 4,601,477 A | 7/1986 | Barrett et al. |
| 4,610,088 A | 9/1986 | Kuhlmann |
| 4,628,605 A | 12/1986 | Clowers |
| 4,628,608 A | 12/1986 | Kuhlmann et al. |
| 4,644,835 A | 2/1987 | Bleicher et al. |
| 4,648,182 A | 3/1987 | Hoffman |
| 4,656,742 A | 4/1987 | Wagner |
| 4,665,617 A | 5/1987 | Maier et al. |
| 4,691,929 A | 9/1987 | Neumaier et al. |
| 4,693,009 A | 9/1987 | Bone |
| 4,708,548 A | 11/1987 | Taylor et al. |
| 4,719,701 A | 1/1988 | Williams |
| 4,721,313 A | 1/1988 | Pennink |
| 4,722,021 A | 1/1988 | Hornung et al. |
| 4,739,557 A | 4/1988 | Wagner |
| 4,771,542 A | 9/1988 | Beveridge |
| 4,798,001 A | 1/1989 | Grossmann et al. |
| 4,813,829 A | 3/1989 | Koppelmann |
| 4,838,138 A | 6/1989 | Rice et al. |
| 4,856,195 A | 8/1989 | Grossmann et al. |
| 4,856,394 A | 8/1989 | Clowers |
| 4,858,661 A | 8/1989 | Bosten et al. |
| 4,858,662 A | 8/1989 | Bosten et al. |
| 4,858,663 A | 8/1989 | Bosten et al. |
| 4,864,727 A | 9/1989 | Chu |
| 4,894,917 A | 1/1990 | Nicolson |
| 4,941,246 A | 7/1990 | Finnegan |
| 4,949,464 A | 8/1990 | Adomatis |
| 4,962,588 A | 10/1990 | Fushiya et al. |
| 4,969,270 A | 11/1990 | Berghauser et al. |
| 4,976,164 A | 12/1990 | Lentino |
| 4,982,501 A | 1/1991 | Sauerwein et al. |
| 5,000,614 A | 3/1991 | Walker et al. |
| 5,012,583 A | 5/1991 | Blochle et al. |
| 5,014,430 A | 5/1991 | Wortham |
| 5,027,518 A | 7/1991 | Adomatis |
| 5,031,324 A | 7/1991 | Berghauser et al. |
| 5,038,473 A | 8/1991 | Bradley |
| 5,058,280 A | 10/1991 | Pollak et al. |
| 5,061,090 A | 10/1991 | Kriaski et al. |
| 5,062,749 A | 11/1991 | Sheets |
| 5,083,376 A | 1/1992 | Lentino |
| 5,090,461 A | 2/1992 | Gakhar et al. |
| 5,099,705 A | 3/1992 | Dravnieks |
| 5,103,565 A | 4/1992 | Holzer, Jr. |
| 5,121,545 A | 6/1992 | Nonaka et al. |
| 5,122,007 A | 6/1992 | Smith |
| 5,134,777 A | 8/1992 | Meyer et al. |
| 5,165,173 A | 11/1992 | Miller |
| 5,175,963 A | 1/1993 | Schafer et al. |
| 5,193,281 A | 3/1993 | Kasten |
| 5,212,887 A | 5/1993 | Farmerie |
| 5,218,767 A | 6/1993 | Wells |
| 5,233,892 A | 8/1993 | Roberts |
| 5,235,752 A | 8/1993 | Sauerwein et al. |
| 5,235,753 A | 8/1993 | Stumpf |
| 5,263,972 A | 11/1993 | Evans et al. |
| 5,267,498 A | 12/1993 | Miyamoto et al. |
| 5,272,948 A | 12/1993 | Theising |
| 5,285,708 A | 2/1994 | Bosten et al. |
| 5,306,025 A | 4/1994 | Langhoff |
| 5,322,302 A | 6/1994 | Quirijnen |
| 5,324,052 A | 6/1994 | Ortmann |
| 5,340,129 A | 8/1994 | Wright |
| 5,351,590 A | 10/1994 | Everts et al. |
| 5,363,733 A | 11/1994 | Baird et al. |
| 5,375,495 A | 12/1994 | Bosten et al. |
| 5,375,636 A | 12/1994 | Bosten et al. |
| 5,383,762 A | 1/1995 | Jacobsson |
| 5,384,984 A | 1/1995 | Smith |
| 5,392,519 A | 2/1995 | Inoue et al. |
| 5,394,302 A | 2/1995 | Trautwein et al. |
| 5,398,414 A | 3/1995 | Neubert et al. |
| 5,402,580 A | 4/1995 | Seto et al. |
| 5,421,091 A | 6/1995 | Gerritsen, Jr. |
| 5,421,232 A | 6/1995 | Laverick |
| 5,433,008 A | 7/1995 | Barger, Jr. et al. |
| 5,433,276 A | 7/1995 | Martain et al. |
| 5,433,457 A | 7/1995 | Wright |
| 5,437,103 A | 8/1995 | Baptiste |
| 5,439,472 A | 8/1995 | Evans et al. |
| 5,442,857 A | 8/1995 | Gugel |
| 5,443,276 A | 8/1995 | Nasser et al. |
| 5,450,925 A | 9/1995 | Smith et al. |
| 5,458,346 A | 10/1995 | Briggs |
| 5,461,947 A | 10/1995 | Batten |
| 5,473,820 A | 12/1995 | Neubert et al. |
| 5,479,711 A | 1/1996 | Hathcock |
| 5,487,221 A | 1/1996 | Oda et al. |
| RE35,258 E | 6/1996 | Palm |
| 5,535,520 A | 7/1996 | Armstrong |
| 5,542,183 A | 8/1996 | Allison |
| 5,544,418 A | 8/1996 | Harada |
| 5,555,626 A | 9/1996 | Fuchs |
| 5,561,909 A | 10/1996 | Berg et al. |
| 5,566,458 A | 10/1996 | Bednar |
| 5,566,768 A | 10/1996 | Bourke |
| 5,573,255 A | 11/1996 | Salpaka |
| 5,575,071 A | 11/1996 | Phillips et al. |
| 5,581,891 A | 12/1996 | Wheeler et al. |
| 5,581,896 A | 12/1996 | Yang |
| 5,588,213 A | 12/1996 | Swanberg |
| 5,595,250 A | 1/1997 | Bourke |
| 5,596,810 A | 1/1997 | Neubert et al. |
| 5,607,265 A | 3/1997 | Lane |
| 5,609,603 A | 3/1997 | Linden |
| 5,615,746 A | 4/1997 | Chu |

| | | | | | | |
|---|---|---|---|---|---|---|
| 5,632,089 A | 5/1997 | Sakamoto et al. | | 6,357,124 B1 | 3/2002 | Wall et al. |
| 5,634,277 A | 6/1997 | Wada et al. | | 6,439,091 B1 | 8/2002 | Dibbern et al. |
| 5,644,846 A | 7/1997 | Durr et al. | | 6,449,851 B1 | 9/2002 | Bone et al. |
| 5,644,847 A | 7/1997 | Odendahl et al. | | 6,467,177 B2 | 10/2002 | Eichberger |
| 5,647,133 A | 7/1997 | Dassoulas | | 6,502,317 B2 | 1/2003 | Dassoulas et al. |
| 5,653,028 A | 8/1997 | Hashimoto | | 6,508,151 B1 | 1/2003 | Neitzell |
| 5,658,304 A | 8/1997 | Lim | | 6,530,303 B1 | 3/2003 | Parks et al. |
| 5,661,909 A | 9/1997 | Kondo et al. | | 6,546,633 B1 | 4/2003 | Lovell et al. |
| 5,687,483 A | 11/1997 | Neubert et al. | | D475,264 S | 6/2003 | Kondo et al. |
| 5,689,891 A | 11/1997 | Bednar et al. | | 6,612,039 B2 | 9/2003 | Kakiuchi et al. |
| 5,697,158 A | 12/1997 | Klinzing et al. | | 6,625,892 B2 | 9/2003 | Takahashi et al. |
| 5,697,279 A | 12/1997 | Schnizler et al. | | 6,638,290 B2 | 10/2003 | Pascaloff et al. |
| 5,718,050 A | 2/1998 | Keller et al. | | D484,381 S | 12/2003 | Yamada et al. |
| 5,722,309 A | 3/1998 | Seyerle | | 6,662,455 B2 | 12/2003 | Tachibana et al. |
| 5,724,741 A | 3/1998 | Bednar | | 6,662,698 B2 | 12/2003 | Wheeler et al. |
| 5,724,742 A | 3/1998 | Grabowski | | 6,694,624 B2 | 2/2004 | Stefanopulos et al. |
| 5,725,058 A | 3/1998 | Eriksson | | 6,705,834 B1 | 3/2004 | Jacobsson |
| 5,727,322 A | 3/1998 | Giacometti | | 6,725,548 B1 | 4/2004 | Kramer et al. |
| 5,728,118 A | 3/1998 | Dross et al. | | 6,735,876 B2 | 5/2004 | Hirabayashi |
| 5,729,904 A | 3/1998 | Trott | | 6,739,171 B2 | 5/2004 | Biederman et al. |
| 5,738,388 A | 4/1998 | Sundelin | | 6,754,967 B2 | 6/2004 | Lovell et al. |
| 5,765,463 A | 6/1998 | Okubo et al. | | 6,810,782 B2 | 11/2004 | Wuensch et al. |
| 5,768,971 A | 6/1998 | O'Banion et al. | | 6,848,186 B1 | 2/2005 | Chen et al. |
| 5,775,999 A | 7/1998 | Hansson et al. | | 6,851,194 B1 | 2/2005 | Chen et al. |
| 5,778,538 A | 7/1998 | Gentinetta et al. | | 6,854,187 B2 | 2/2005 | Huan |
| 5,794,352 A | 8/1998 | Dassoulas | | 6,857,348 B1 | 2/2005 | Mason |
| 5,810,367 A | 9/1998 | Holzer, Jr. et al. | | 6,877,751 B2 | 4/2005 | Hsing |
| 5,819,420 A | 10/1998 | Collins | | 6,893,026 B2 | 5/2005 | Yoshimura et al. |
| 5,819,421 A | 10/1998 | Giacometti et al. | | 6,907,807 B2 | 6/2005 | Parks et al. |
| 5,839,950 A | 11/1998 | Johansson Edling et al. | | 6,944,959 B2 | 9/2005 | Bigden et al. |
| 5,842,267 A | 12/1998 | Biederman et al. | | 6,955,287 B2 | 10/2005 | Horii et al. |
| 5,848,474 A | 12/1998 | Fortney et al. | | 7,003,887 B2 | 2/2006 | Wadge |
| 5,870,829 A | 2/1999 | Gugel et al. | | 7,003,888 B2 | 2/2006 | Bigden et al. |
| 5,884,832 A | 3/1999 | Funamoto et al. | | 7,013,987 B2 | 3/2006 | Nock et al. |
| 5,903,983 A | 5/1999 | Jungmann et al. | | 7,040,023 B2 | 5/2006 | Nemazi et al. |
| RE36,269 E | 8/1999 | Wright | | 7,044,716 B2 | 5/2006 | Fabry |
| 5,934,846 A | 8/1999 | Ishii | | D525,842 S | 8/2006 | Andriolo |
| 5,937,724 A | 8/1999 | O'Banion et al. | | 7,082,689 B2 | 8/2006 | Beville et al. |
| 5,940,977 A | 8/1999 | Moores, Jr. | | 7,096,589 B2 | 8/2006 | Phillips et al. |
| 5,946,810 A | 9/1999 | Hoelderlin et al. | | D527,596 S | 9/2006 | Andriolo |
| 5,953,974 A | 9/1999 | Hegler et al. | | 7,107,690 B2 | 9/2006 | Lui et al. |
| 5,954,347 A | 9/1999 | Buck et al. | | 7,111,405 B2 | 9/2006 | Delfini et al. |
| 5,964,039 A | 10/1999 | Mizoguchi et al. | | 7,121,008 B2 | 10/2006 | Bone et al. |
| 5,967,243 A | 10/1999 | Jacobsson | | 7,127,923 B2 | 10/2006 | Biederman et al. |
| 5,971,403 A | 10/1999 | Yahagi et al. | | 7,137,542 B2 | 11/2006 | Oki et al. |
| 5,984,596 A | 11/1999 | Fehrle et al. | | 7,157,833 B2 | 1/2007 | Hess |
| 5,987,758 A | 11/1999 | McCurry et al. | | 7,204,026 B2 | 4/2007 | Phillips et al. |
| 5,988,034 A | 11/1999 | Okubo et al. | | 7,210,232 B2 | 5/2007 | Guo |
| 5,988,957 A | 11/1999 | Wheeler | | 7,216,434 B2 | 5/2007 | Eto et al. |
| 5,989,257 A | 11/1999 | Tidwell et al. | | 7,246,533 B2 | 7/2007 | Lagaly et al. |
| 5,996,452 A | 12/1999 | Chiang | | 7,251,897 B2 | 8/2007 | Shuhua |
| 6,009,627 A | 1/2000 | Dassoulas et al. | | 7,257,900 B2 | 8/2007 | Wheeler et al. |
| D420,876 S | 2/2000 | Bosten et al. | | 7,325,315 B2 | 2/2008 | Bigden et al. |
| 6,023,848 A | 2/2000 | Dassoulas et al. | | 7,441,338 B2 | 10/2008 | Delfini et al. |
| 6,039,038 A | 3/2000 | Buck et al. | | 7,871,080 B2 * | 1/2011 | Marini et al. ............ 279/71 |
| 6,044,743 A | 4/2000 | O'Banion et al. | | 2003/0051352 A1 | 3/2003 | Clark, Jr. |
| 6,047,477 A | 4/2000 | Di Nicolantonio | | 2003/0145472 A1 | 8/2003 | Swift |
| 6,101,726 A | 8/2000 | Laverick | | 2003/0150120 A1 | 8/2003 | Hartmann et al. |
| 6,112,420 A | 9/2000 | Schickerling | | 2004/0035010 A1 | 2/2004 | Kakiuchi et al. |
| 6,148,526 A | 11/2000 | Kirn et al. | | 2004/0045425 A1 | 3/2004 | Houben et al. |
| 6,178,646 B1 | 1/2001 | Schnell et al. | | 2004/0194324 A1 | 10/2004 | Youn-Chyuan |
| 6,189,217 B1 | 2/2001 | Melvin et al. | | 2004/0251642 A1* | 12/2004 | Shuhua ............ 279/96 |
| 6,193,470 B1 | 2/2001 | Aurbeck | | 2005/0000338 A1 | 1/2005 | Wascow |
| 6,209,208 B1 | 4/2001 | Marinkovich et al. | | 2005/0039339 A1* | 2/2005 | Chen et al. ............ 30/392 |
| 6,213,381 B1 | 4/2001 | Funamoto et al. | | 2005/0120568 A1 | 6/2005 | Wilson |
| 6,230,411 B1 | 5/2001 | Wall et al. | | 2005/0132584 A1 | 6/2005 | Cornwell et al. |
| 6,233,833 B1 | 5/2001 | Grant et al. | | 2005/0144791 A1 | 7/2005 | Ritter et al. |
| 6,237,231 B1 | 5/2001 | Jungmann et al. | | 2005/0283984 A1 | 12/2005 | Walmsley |
| 6,241,027 B1 | 6/2001 | Beck et al. | | 2006/0053639 A1 | 3/2006 | Nakanishi |
| 6,249,982 B1 | 6/2001 | Zaiser | | 2006/0096103 A1 | 5/2006 | Roberts |
| 6,260,281 B1 | 7/2001 | Okumura et al. | | 2006/0174495 A1 | 8/2006 | Jumior |
| 6,267,038 B1 | 7/2001 | O'Banion et al. | | 2006/0260141 A1 | 11/2006 | Phillips et al. |
| 6,276,065 B1 | 8/2001 | Osada et al. | | 2007/0007025 A1 | 1/2007 | Nock et al. |
| 6,282,797 B1 | 9/2001 | Osada et al. | | 2007/0101587 A1 | 5/2007 | Bone |
| 6,290,439 B1 | 9/2001 | Bludis et al. | | 2007/0131075 A1 | 6/2007 | Zhang et al. |
| 6,295,736 B1 | 10/2001 | Dassoulas et al. | | 2007/0131076 A1 | 6/2007 | Yasheng |
| 6,308,425 B1 | 10/2001 | Schumann | | 2007/0151112 A1 | 7/2007 | Rakaczki |
| 6,327,952 B1 | 12/2001 | O'Banion et al. | | 2007/0163415 A1 | 7/2007 | Ritter et al. |
| 6,336,790 B1 | 1/2002 | Jacobsson | | 2007/0193041 A1 | 8/2007 | Eto et al. |

| 2008/0168666 | A1* | 7/2008 | Zhou | 30/339 |
| 2009/0072500 | A1* | 3/2009 | Scott | 279/9.1 |
| 2009/0277022 | A1* | 11/2009 | Limberg et al. | 30/392 |

FOREIGN PATENT DOCUMENTS

| | | |
|---|---|---|
| DE | 8907513 | 8/1989 |
| DE | 9006197 | 9/1990 |
| DE | 4102011 | 12/1991 |
| DE | 9305188 | 6/1993 |
| DE | 19532494 | 3/1997 |
| DE | 29810746 | 9/1998 |
| DE | 20013789 | 12/2000 |
| DE | 10106051 | 8/2002 |
| EP | 0623413 | 11/1994 |
| EP | 0623414 | 11/1994 |
| EP | 0855239 | 7/1998 |
| EP | 0940210 | 9/1999 |
| EP | 1038624 | 9/2000 |
| EP | 0719610 | 11/2001 |
| EP | 1172167 | 1/2002 |
| EP | 1203628 | 5/2002 |
| GB | 2192363 | 1/1988 |
| GB | 2302060 | 1/1997 |
| GB | 2322328 | 8/1998 |
| GB | 2328643 | 3/1999 |
| GB | 2336805 | 11/1999 |
| GB | 2336806 | 11/1999 |
| JP | 62-259801 | 11/1987 |
| JP | 4-79019 | 7/1992 |
| JP | 6-55703 | 8/1994 |
| WO | 95/27583 | 10/1995 |
| WO | 00/47358 | 8/2000 |

* cited by examiner

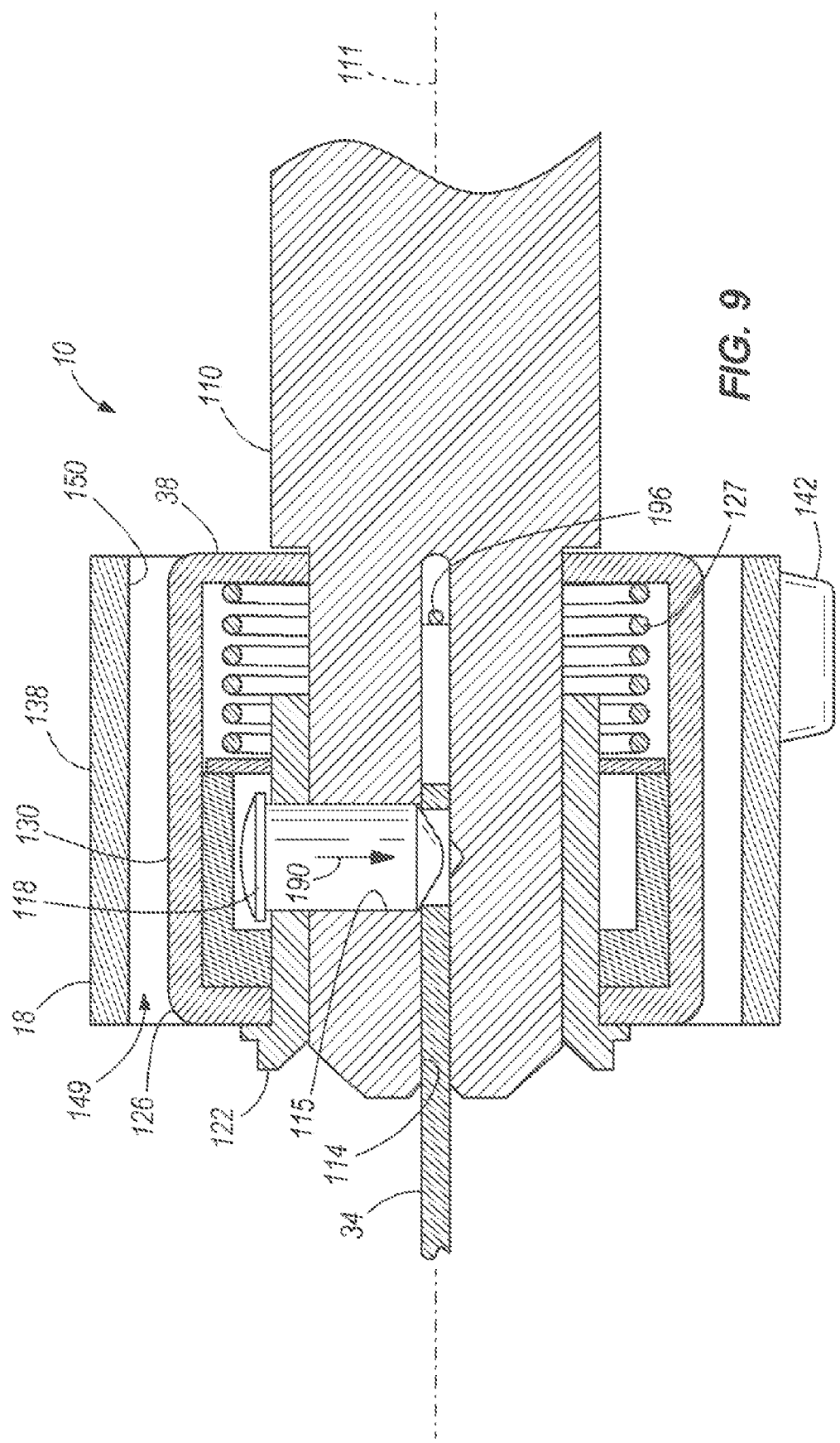

KEYLESS BLADE CLAMP FOR A POWER TOOL

CROSS-REFERENCE TO RELATED APPLICATIONS

This application claims priority to U.S. Provisional Patent Application No. 61/051,834, filed May 9, 2008, the entire contents of which is hereby incorporated by reference herein.

BACKGROUND OF THE INVENTION

The present invention relates to reciprocating power tools, and more particularly to keyless blade clamps for quickly and easily replacing and securing a saw blade to a spindle of a reciprocating saw.

Reciprocating tools, such as reciprocating saws, include removable blades to permit the use of different types of blades and to allow for replacement of worn or damaged blades. Accordingly, reciprocating saws typically include a blade mounting system that allows for blade replacement while firmly coupling the blade to the tool. Often, blade mounting systems utilize a tool, such as an allen wrench or special key, in order to replace and secure the blade. Alternatively, the saw may include a keyless blade clamp that does not utilize a special tool.

SUMMARY OF THE INVENTION

In one embodiment, the invention provides a reciprocating tool including a housing having a sidewall that defines a cavity and a spindle mounted for reciprocating movement with respect to the housing within the cavity of the housing. The spindle includes a longitudinal axis and an end configured to receive a saw blade. A blade clamp mechanism actuator is coupled to the housing for movement with respect to the housing between a first position and a second position. The spindle reciprocates with respect to the blade clamp mechanism actuator. A blade clamp mechanism is coupled to the spindle for reciprocating movement therewith, and the blade clamp mechanism is configured to attach the saw blade to the spindle. The blade clamp mechanism includes a collar mounted on the end of the spindle, and the collar is rotatable about the longitudinal axis of the spindle between an engaged position and a disengaged position in response to movement of the blade clamp mechanism actuator between the first position and the second position. A locking member is movable relative to the spindle between a locked position that attaches the saw blade to the spindle and an unlocked position that releases the saw blade from the spindle. Rotation of the collar from the disengaged position to the engaged position moves the locking member from the unlocked position to the locked position. Rotation of the collar from the engaged positions to the disengaged positions allows the locking member to move from the locked position to the unlocked position.

In another embodiment, the invention provides a blade clamp system for use with a reciprocating tool including a housing defining a cavity and a spindle mounted for reciprocating movement within the cavity and with respect to the housing. The spindle includes an end configured to receive a saw blade. The blade clamp system includes an actuator having a first member positioned within the cavity of the housing and a second member extending from the first member. The second member is at least partially positioned outside the cavity, and the actuator is coupled to the housing for movement with respect to the housing between a first position and a second position. The spindle reciprocates with respect to the actuator. The blade clamp system further includes a collar for mounting on the end of the spindle and selectively engaging the first member of the actuator. The collar is rotatable about the spindle between an engaged position and a disengaged position in response to movement of the actuator between the first position and the second position. When the actuator is in the first position, the collar is in the engaged position and is disengaged with the first member, and when the actuator is in the second position, the collar is in the disengaged position and engaged with the first member. A locking member is movable relative to the spindle between a locked position that attaches the saw blade to the spindle and an unlocked position that releases the saw blade from the spindle. Rotation of the collar from the disengaged position to the engaged position moves the locking member from the unlocked position to the locked position, and rotation of the collar from the engaged position to the disengaged position allows the locking member to move from the locked position to the unlocked position.

Other aspects of the invention will become apparent by consideration of the detailed description and accompanying drawings.

BRIEF DESCRIPTION OF THE DRAWINGS

FIG. 9 is a cross-sectional view of the blade clamp mechanism actuator and the blade clamp mechanism of FIG. 8 taken along line 9-9 of FIG. 8.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
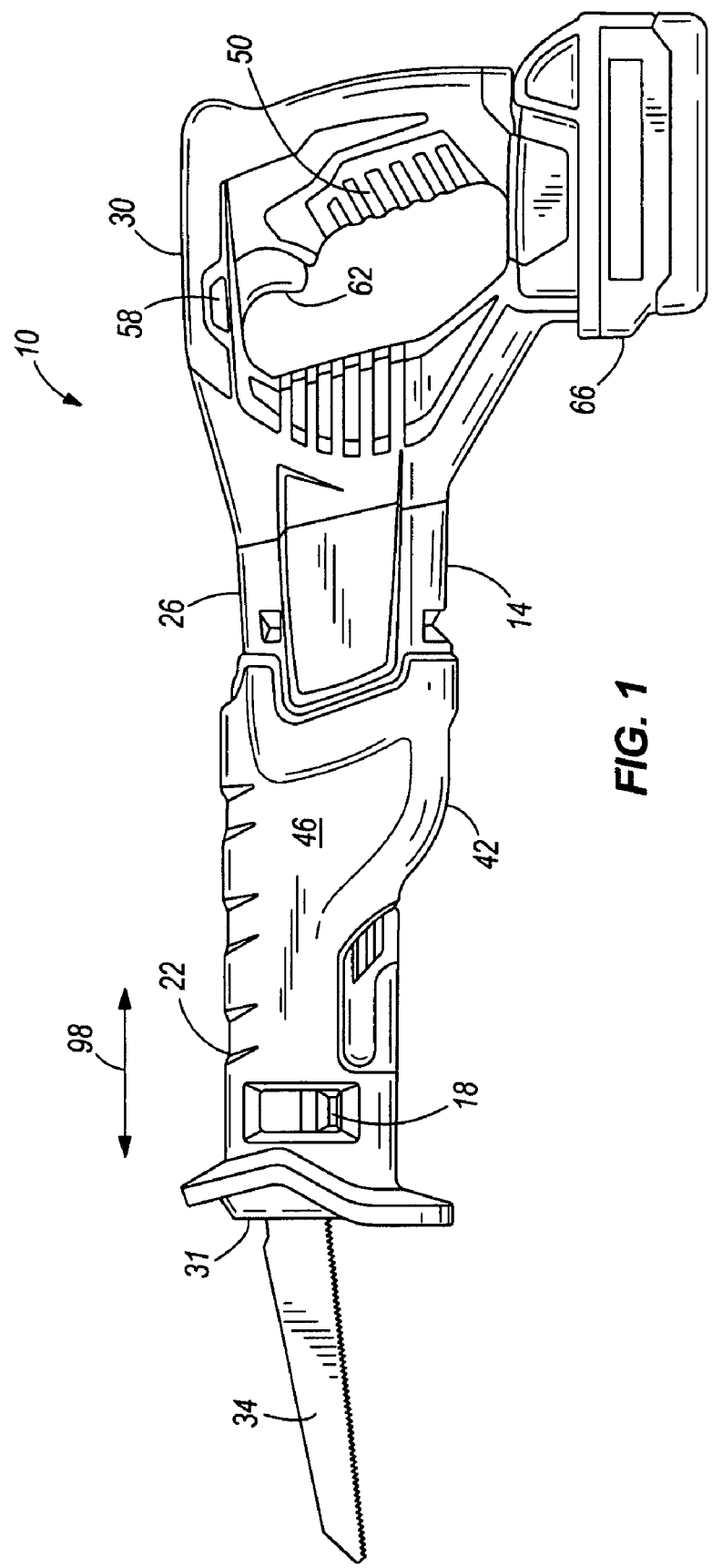
FIG. 1 is a side view of a reciprocating power tool including a blade clamp actuator according to an embodiment of the invention.
Figure 2:
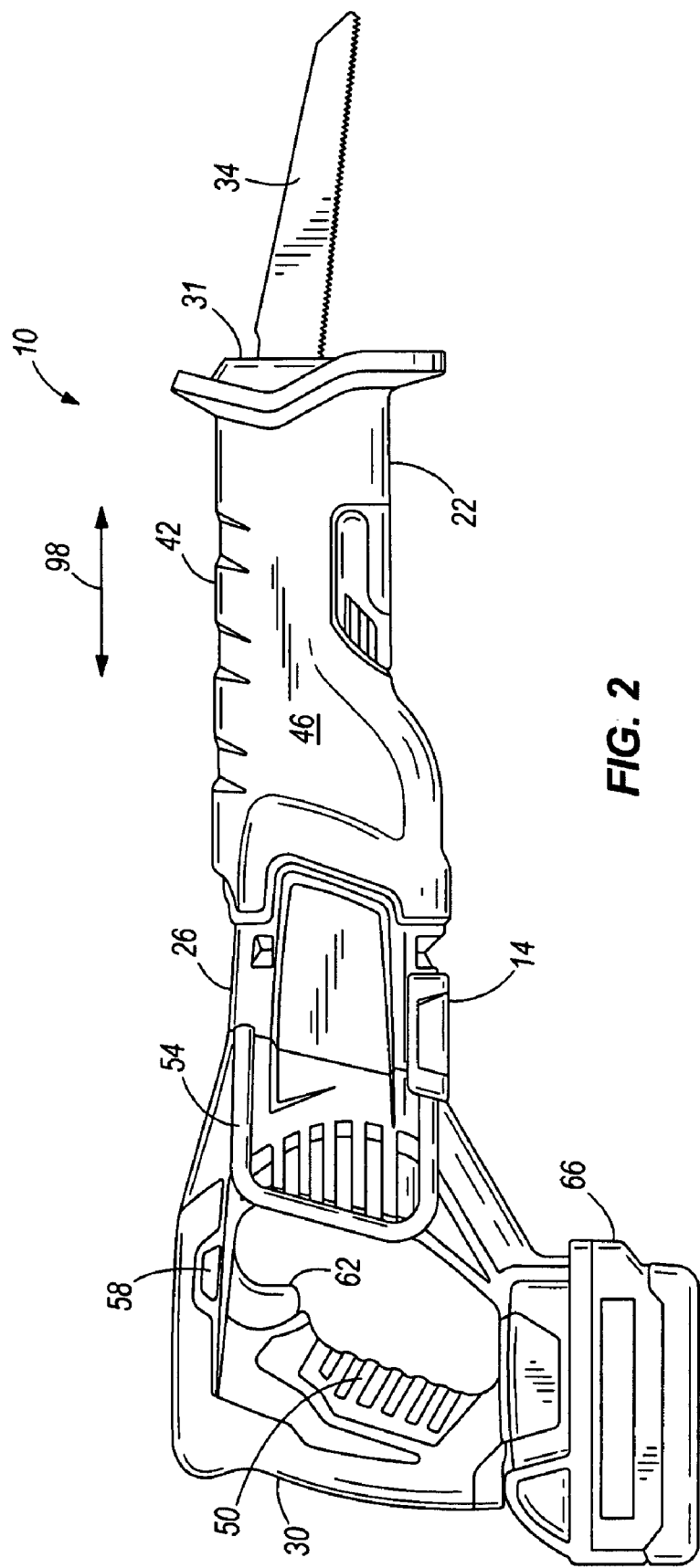
FIG. 2 is an opposite side view of the reciprocating power tool shown in FIG. 1.
Figure 3:
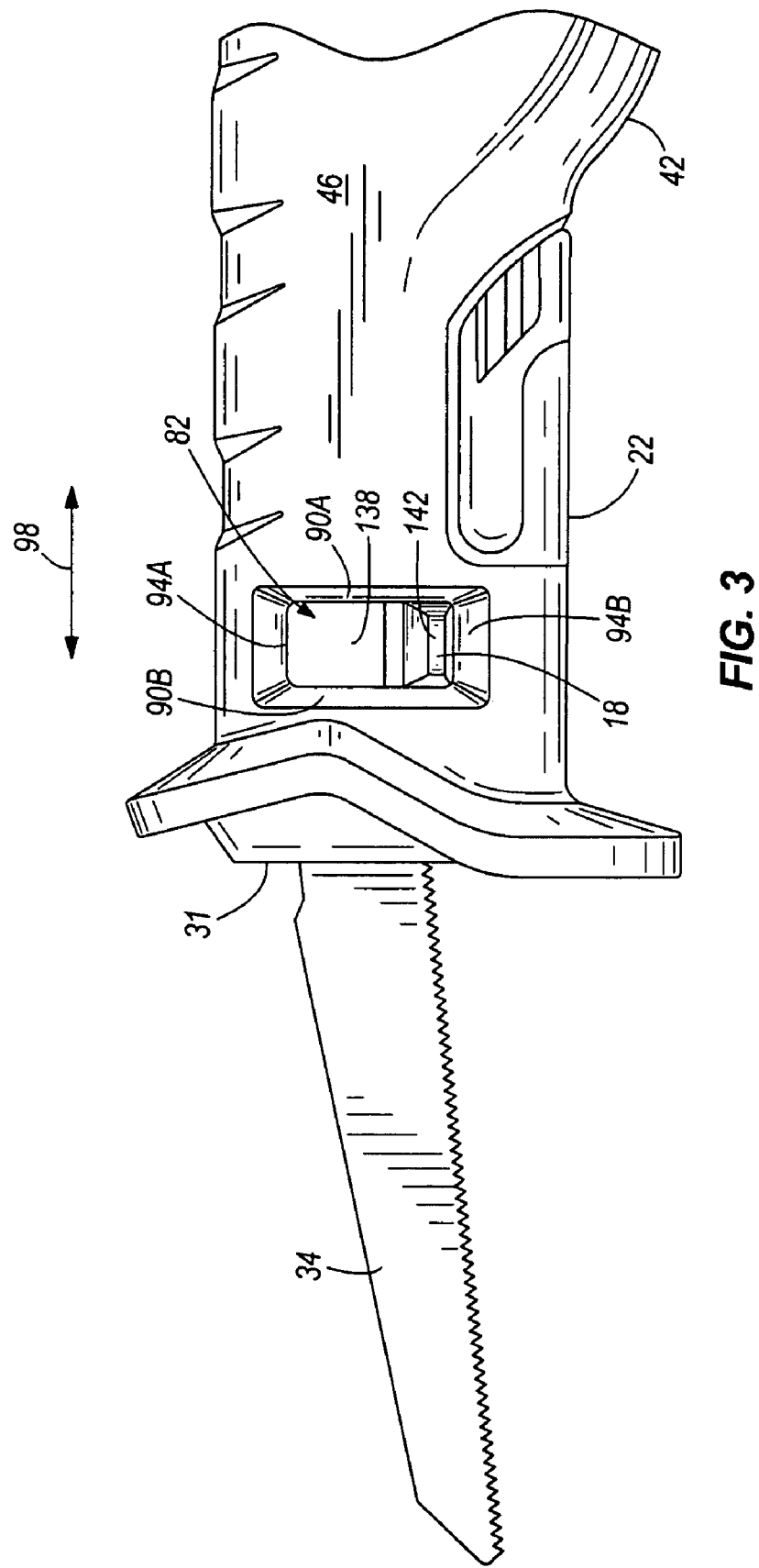
FIG. 3 is an enlarged side view of the blade clamp actuator shown in FIG. 1.

FIG. 1 illustrates a reciprocating power tool 10 including a blade clamp actuator 18 according to one embodiment of the invention. The illustrated reciprocating power tool is a reciprocating saw; however, in other embodiments, other reciprocating power tools may include the invention. As shown in FIGS. 1 and 2, the power tool 10 includes a saw housing 14 having a forward portion 22, a body portion 26 housing a motor (not shown), and a handle portion 30. The forward portion 22 of the saw housing 14 includes a blade receiving aperture or end 31 that receives a saw blade 34. The saw blade 34 is releasably coupled to a blade clamp mechanism 38 (FIGS. 6-9) positioned within the saw housing 14. In the illustrated embodiment, a boot or grip portion 42 is positioned over the forward portion 22 of the saw housing 14. In this embodiment, the boot 42 provides a grip area 46 for the user and/or provides protection to the tool. In some embodiments, the boot 42 is over-molded onto the forward portion 22. The handle portion 30 includes an over-mold to define an ergonomic grip 50 and allows a user to hold and control the power tool 10. The power tool 10 includes a hook 54 (FIG. 2) coupled to the body portion 26 of the saw housing 14 for hanging the power tool 10 for storage.

With continued reference to FIGS. 1 and 2, the power tool 10 includes a trigger-type power switch 62 for activating a power supply 66 of the tool 10 and a button or switch 58 (FIGS. 1 and 2) for selecting a speed level (e.g., a high speed or a low speed) for reciprocating the saw blade 34. In the illustrated embodiment, the power supply 66 is a rechargeable battery pack. The battery pack 66 is releasably coupled to the handle portion 30 to provide power to the power tool 10, and is releasable away from and rearward of the handle portion 30. In the illustrated embodiment, the battery pack 66 is an eighteen-volt (18V) rechargeable power tool battery pack. In other embodiments, the battery pack 66 may be a twelve-volt (12V), a twenty-four-volt (24V), or other various voltages that are known in the art. According to another embodiment, the power tool 10 may be powered by an alternating current (AC) power provided via a corded plug electrically coupled to a wall outlet or any number of suitable powering options.

In other embodiments, the power tool 10 may include various handle constructions and battery configurations that are known in the art. In further embodiments, the power tool 10 may include other types of power and speed control switches or may not include a speed control feature.

Figure 4:
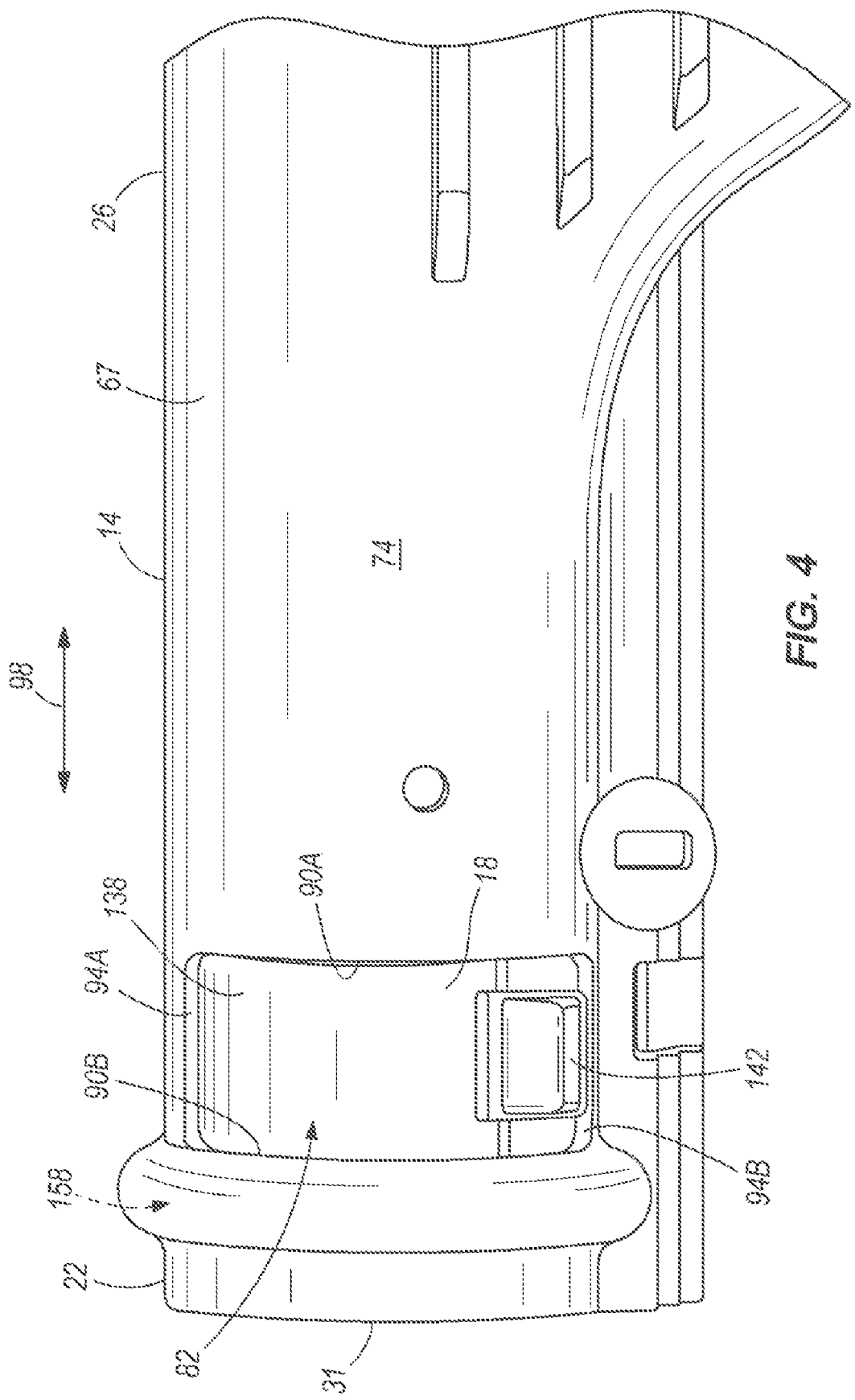
FIG. 4 is a side view of a saw housing and the blade clamp actuator shown in FIG. 1 with a boot or grip portion removed.
Figure 5:
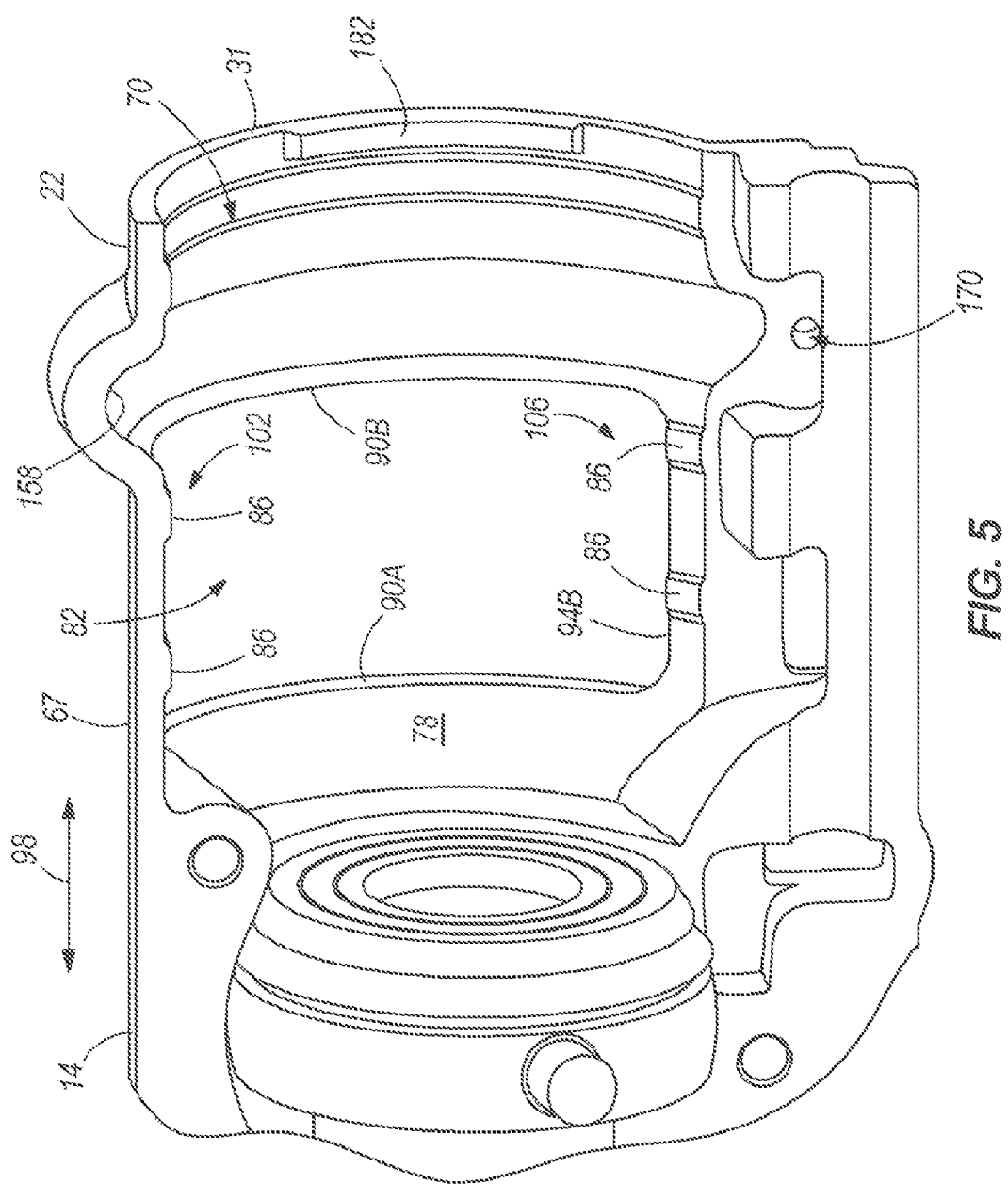
FIG. 5 illustrates an inner cavity of the saw housing.
Figure 6:
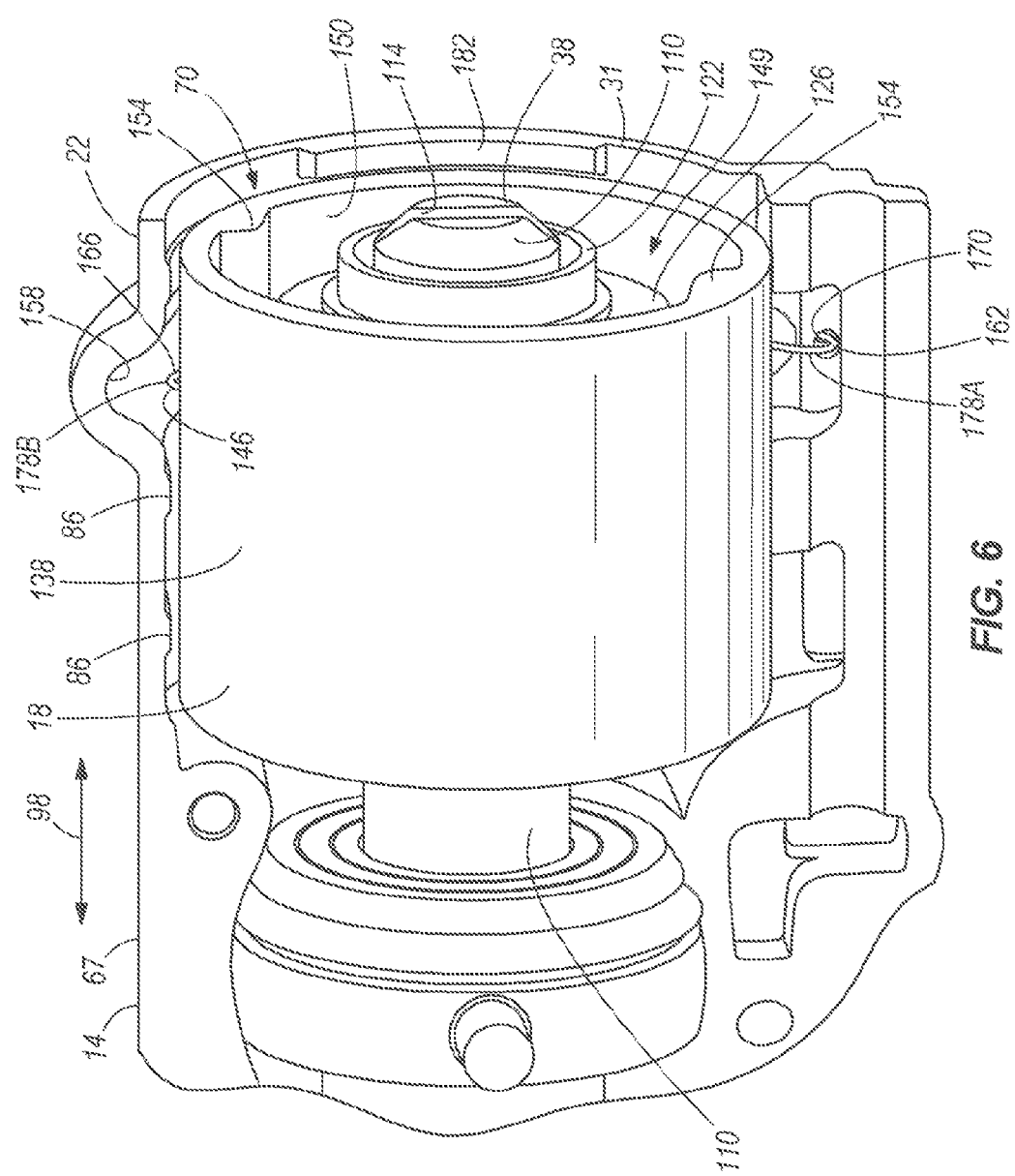
FIG. 6 illustrates the inner cavity of the saw housing, including the blade clamp actuator and a blade clamp mechanism.

Referring to FIGS. 5-7b, in the illustrated embodiment, the saw housing 14 includes a curved sidewall 67 that has a generally oval-shaped cross section (half of which is shown in FIGS. 5-7b), and the sidewall 67 defines an inner cavity 70 of the saw housing 14. Referring to FIGS. 4-6, the sidewall 67 of the saw housing 14 further includes an exterior surface 74, an interior surface 78 that helps define the inner cavity 70, and an opening 82 that extends through the sidewall 67 from the exterior surface 74 to the interior surface 78 of the saw housing 14. The opening 82 includes a pair of first edges 90A and 90B, and a pair of second edges 94A and 94B. Each first edge 90A, 90B extends along a portion of a circumferential perimeter of the saw housing 14 to define a length of the opening 82, and each second edge 94A, 94B extends between the first edges 90A, 90B and parallel to a reciprocating direction 98 of the power tool 10 to define a width of the opening 82. The first and second edges 90, 94 form a generally rectangular-shaped opening 82. The opening 82 has an arc-shape that is defined by the sidewall 67 of the saw housing 14.

Referring to FIGS. 5 and 6, the saw housing 14 also includes ribs 86 that protrude inwardly from the interior surface 78. In one embodiment, the ribs 86 help to maintain a position of the blade clamp actuator 18 within the inner cavity 70 while minimizing the surface contact between the interior surface 78 and the blade clamp actuator 18. By minimizing the surface contact, the likelihood of contamination (that may enter through the opening 82) that may inhibit and/or prohibit movement of the blade clamp actuator 18 is reduced. As shown, the ribs 86 can be arranged as a first rib group 102 and a second rib group 106. The rib groups 102, 106 are positioned at opposite ends of the opening 82 and proximate the respective second edge 94A, 94B. In other embodiments, the ribs 86 may be positioned elsewhere on the interior surface 78 of the saw housing 14 to help maintain a position of the blade clamp actuator 18. In still further embodiments, the ribs 86 can be removed. In these embodiments, the saw cavity 70 is sized such that a portion of the blade clamp actuator 18 abuts the interior surface 78 and helps maintain the position of the blade clamp actuator 18 within the inner cavity 70.

Referring to FIGS. 4-9, the power tool 10 includes a blade clamp system for releasably coupling the saw blade 34 to the tool 10, and providing a quick and easy system for replacing and securing the saw blade 34. The blade clamp system includes the blade clamp mechanism actuator 18 and the blade clamp mechanism 38 positioned in the inner cavity 70 at the forward portion 22 of the saw housing 14. The blade clamp mechanism 38 is coupled to a reciprocatable spindle 110 (FIGS. 6-8) interconnected with a drive shaft of the tool motor (not shown). The spindle 110 is adapted to be mounted for reciprocation within the saw housing 14 of the power tool 10 such that the spindle 110 reciprocates with respect to the housing 14 and blade clamp mechanism actuator 18. The spindle 110 has a longitudinal axis 111 and a slot 114 formed at an end of the spindle 110. The slot 114 is dimensioned to receive the saw blade 34. As best seen in FIG. 9, the spindle 110 further includes a second slot or aperture 115 that is transverse to the slot 114.

Figure 7A:
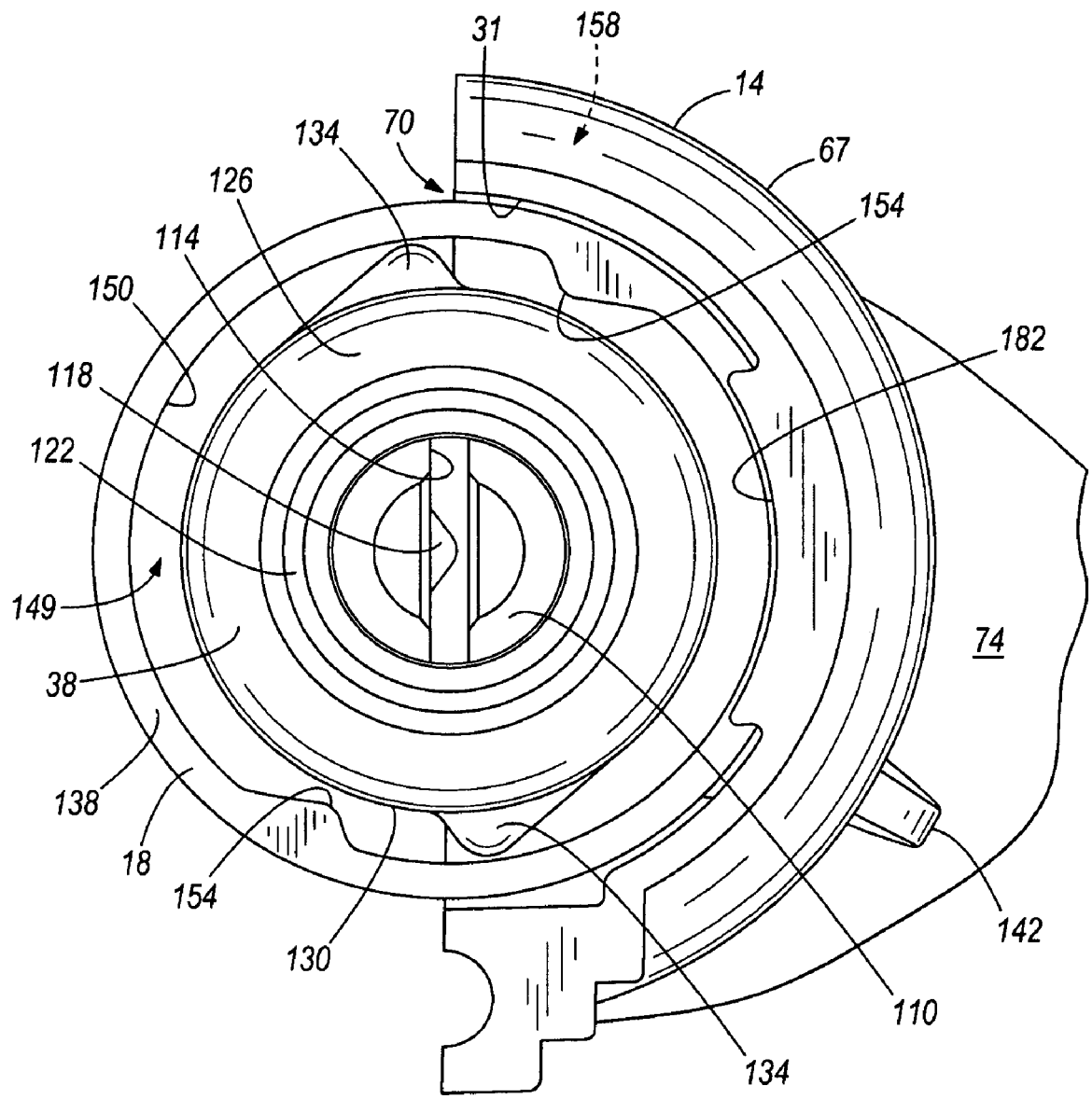
FIG. 7a is an end view of a portion of the saw housing, including the blade clamp actuator and the blade clamp mechanism in an engaged position.
Figure 7B:
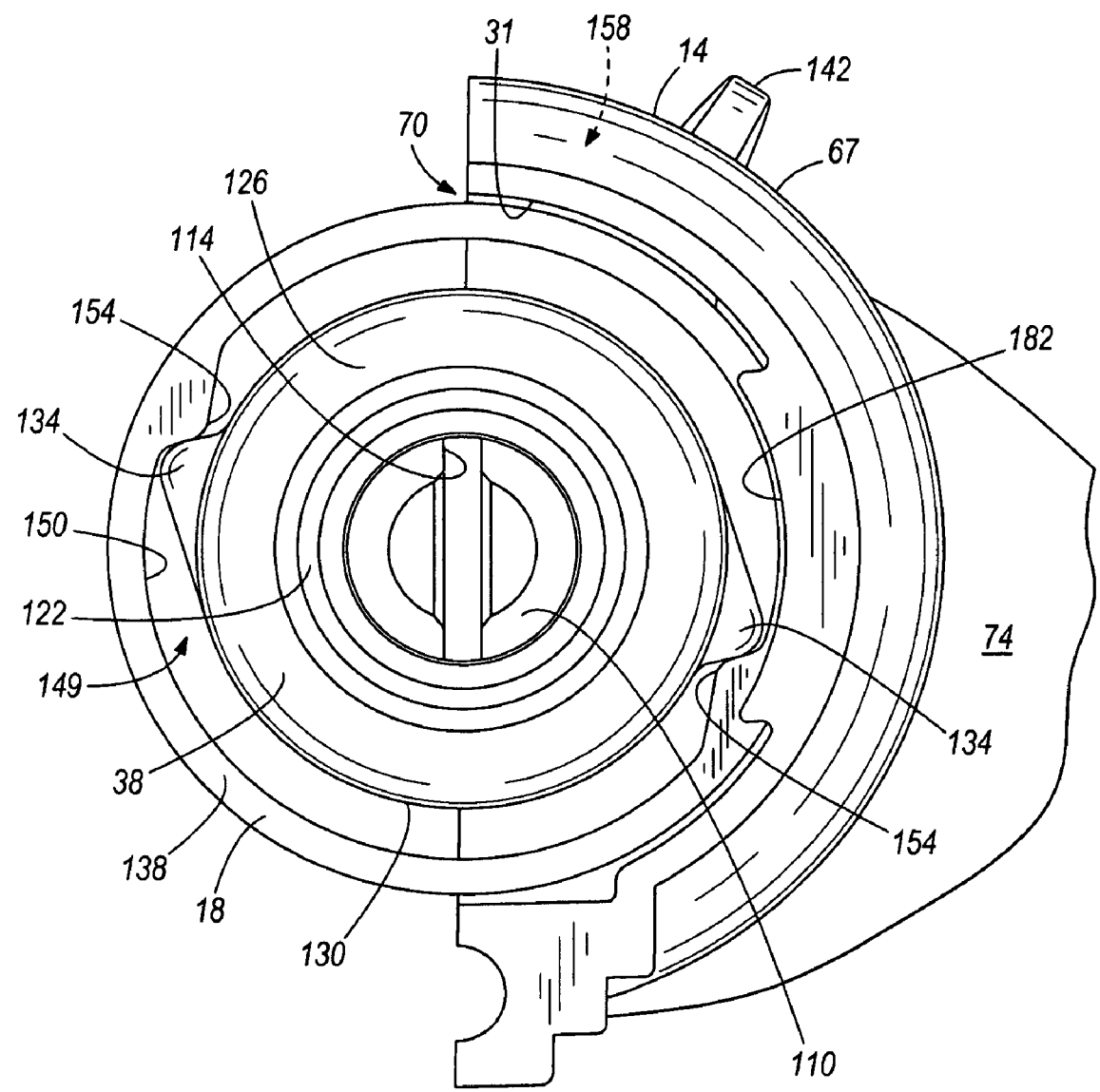
FIG. 7b is an end view of the portion of the saw housing shown in FIG. 7a, including the blade clamp actuator and the blade clamp mechanism in a disengaged position.

The blade clamp mechanism 38 includes a locking member 118, which is a pin in the illustrated embodiment, slidably positioned within the aperture 115 such that the locking member 118 slides further into and out of the spindle slot 114 for engaging the saw blade 34. The blade clamp mechanism 38 also includes a sleeve 122 positioned about the spindle 110 for forcing the locking member 118 into engagement with the saw blade 34. A collar 126 is rotatably positioned over the sleeve 122 for allowing a user to release the locking member 118 from engagement with the saw blade 34. A biasing member 127, which is a torsion spring in the illustrated embodiment, biases the collar 126 toward the engaged position. One example of the blade clamp mechanism 38 is disclosed in U.S. Pat. No. 6,725,548, issued Apr. 27, 2004, the entire contents of which is hereby incorporated by reference. In further embodiments, other keyless or rotatable blade clamp mechanisms may be used in the blade clamp system. As best seen in FIGS. 7a and 7b, the collar 126 of the blade clamp mechanism 38 has an outer surface 130 including a pair of cam members 134, or wings, that extend outwardly from the outer surface 130.

The blade clamp mechanism actuator 18 is positioned about or around the blade clamp mechanism 38 such that the blade clamp actuator 18 is between the sidewall 67 of the saw housing 14 and the blade clamp mechanism 38. The blade clamp actuator 18 includes a collar or sleeve 138, a lever 142 extending outwardly from the sleeve 138, and a spring member 146 for biasing the blade clamp actuator 18 to a first, engaged, or clamped, position (FIG. 7a). The sleeve 138 of the blade clamp actuator 18 is retained in the inner cavity 70 of the saw housing 14. Referring to FIGS. 6-9, the sleeve 138 has a generally circular shape defining a channel or cavity 149 such that the blade clamp mechanism 38 is positioned within the cavity 149. An inner surface 150 of the sleeve 138 includes a pair of cam members 154, or wings, extending radially inward from the inner surface 150 and into the cavity 149. The lever 142 extends radially outward or away from the cavity 149, and in the illustrated embodiment the lever 142 is integrally formed with the sleeve 138 as a single piece, such as by molding. In other embodiments, the sleeve 138 and the lever 142 may be formed as two separate pieces that are coupled together.

As best seen in FIG. 4, the lever 142 of the actuator 18 is positioned in the opening 82 of the saw housing 14 and extends out of the inner cavity 70 to be accessible to a user. The blade clamp actuator 18 is rotatable within the inner cavity 70 about the longitudinal axis 111 of the spindle 110 using the lever 142 to allow a user to rotate the blade clamp actuator 18 relative to the saw housing 14. As discussed below, when the blade clamp actuator 18 is rotated by the user, the cam members 154 of the sleeve 138 releasably engage the cam members 134 of the blade clamp mechanism 38 to thereby translate rotational movement to the collar 126 of the blade clamp mechanism 38.

Figure 8:
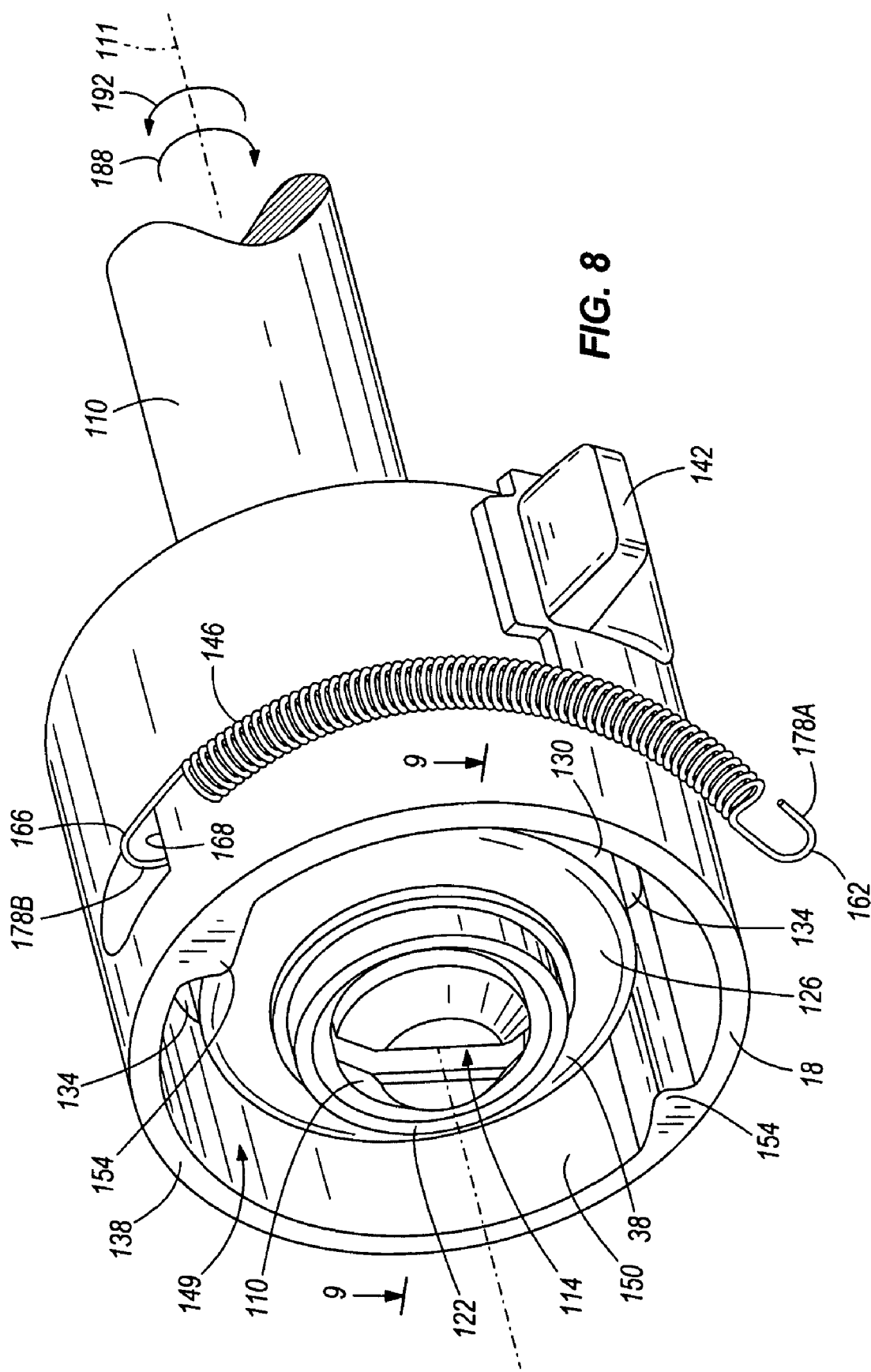
FIG. 8 illustrates the blade clamp mechanism actuator and the blade clamp mechanism.

Referring to FIGS. 5, 6, and 8, the interior surface 78 of the sidewall 67 of the saw housing 14 defines a channel 158 (FIG. 5) positioned proximate to and forward of the opening 82 for receiving the spring 146. The channel 158 has a depth that is recessed outwardly from the interior surface 78 and toward the exterior surface 74, and has a length that follows the contours of the perimeter of the saw housing 14. As best seen in FIGS. 6 and 8, the spring 146 includes a first end 162 and a second end 166. The first end 162 of the spring 146 is coupled to a spring aperture 170 formed in the interior surface 78 of the saw housing 14. The second end 166 of the spring 146 is coupled to a pocket 168 formed in the sleeve 138 of the blade clamp actuator 18. In the illustrated embodiment, each spring end 162, 166 includes a hook 178A and 178B for coupling the spring 146 to the respective surface. The spring 146 biases the blade clamp actuator 18 to the first or engaged position (FIGS. 4 and 7a), and upon rotation of the blade clamp actuator 18 by the user, the spring bias is overcome. The spring 146 can extend around the sleeve 138 in either a clockwise or counter-clockwise direction (clockwise is shown in the illustrated embodiment) such that the spring 146 biases the blade clamp actuator 18 against the opposite second edge 94A as compared to the illustrated embodiment. Also, while the illustrated embodiment includes the spring 146, which is a coil spring, in other embodiments other types of springs, such as torsion springs, and other types of biasing members may be utilized to bias the actuator 18.

Referring to FIGS. 6 and 7a, the blade clamp actuator 18 is positioned within the inner cavity 70 of the saw housing 14 and is positioned about or around the blade clamp mechanism 38. The blade clamp actuator 18 is generally axially stationary relative to the saw housing 14 and does not reciprocate with the spindle 110 and the blade clamp mechanism 38. However, the actuator 18 is allowed some, slight axial movement to float or move slightly with respect to the housing 14. In the illustrated embodiment, the blade clamp actuator 18 glides or floats within the saw housing 14 to allow rotational, radial and transverse movement of the blade clamp actuator 18 with respect to the saw housing 14 and the blade clamp mechanism 38. In addition, the blade clamp actuator 18 may intermittently slide against or abut the interior surface 78 of the saw housing 14 or slightly move axially relative to the saw housing 14. Furthermore, the floating blade clamp actuator 18 is able to sporadically contact various surfaces of the saw housing 14 and the blade clamp mechanism 38. For example, upon rotation, the sleeve 138 and/or the cam members 154 formed therewith may slide against the collar 126 of the blade clamp mechanism 38 prior to engagement of the cam members 134, 154.

Referring to FIGS. 5-7b, the forward portion 22 of the saw housing 14 includes a flange 182 for helping to maintain the blade clamp actuator 18 in the housing 14 and to limit movement of the actuator 18 along the spindle 110. The flange 182 is positioned proximate to the blade receiving end 31 of the saw housing 14, and in the illustrated embodiment is integrally formed with the interior surface 78 of the saw housing 14. The flange 182 protrudes radially inward from the interior surface 78 of the saw housing 14. The sleeve 138 of the blade clamp actuator 18 intermittently slides against or abuts the flange 182 and the lever intermittently slides against or abuts the first edges 90A, 90B and the second edge 94B of the opening 82. The contact between the blade clamp actuator 18 and the saw housing 14 components (e.g., the flange 182 and the edges 90A, 90B, 94B) prevents axial removal of the blade clamp actuator 18 from the inner cavity 70 of the saw housing 14. In another embodiment, the flange 182 may comprise multiple flanges positioned proximate to the blade receiving end 31 of the saw housing 14.

FIGS. 4, 7a, and 8 illustrate the blade clamp system in a first, engaged or clamped, position, albeit with the saw blade 34 removed. In the first or engaged position, the spring 146 biases the blade clamp actuator 18 out of contact with the blade clamp mechanism 38. Referring to FIG. 9, the spring 127 of the blade clamp mechanism 38 biases the collar 126 to the engaged position (in the direction of arrow 188 of FIG. 8). This bias of the collar 126 forces the locking member 118 in the direction of arrow 190 and further into the slot 114 of the spindle 110 to engage or clamp the blade 34. When the blade clamp mechanism 38 is in a clamped or engaged position the saw blade 34 is attached or secured to the power tool 10 because the locking member 118 is held in a locked position by the collar 126. Also, when the blade clamp mechanism 38 and the actuator 18 are in the engaged positions, the lever 142 of the actuator 18 abuts the second edge 94B of the opening 82 and the cam members 154 and 134 of the sleeve 138 and blade clamp mechanism 38 are separated, as best shown in FIGS. 4 and 7a.

To allow release of the saw blade 34 from the blade clamp mechanism 38, a user rotates the blade clamp actuator 18 about the spindle 110 generally in the direction of arrow 192 of FIG. 8 to a second, disengaged or released, position (FIG. 7b). A user rotates the lever 142 away from the abutting edge 94B of the opening 82 (i.e., towards the opposite edge 94A of the opening 82) and against the biasing force of the spring 146, which causes the sleeve 138 of the actuator 18 to rotate relative to the collar 126 of the blade clamp mechanism 38. The sleeve 138 rotates independently of the blade clamp mechanism 38 for part of the rotational travel applied by the user and until the cam members 154 of the actuator sleeve 138 engage the cam members 134 of the mechanism collar 126. The position of the sleeve 138 within the cavity 70 is maintained by the ribs 86 of the housing 14 that abut the sleeve 138. The ribs 86 abut the sleeve 138 during rotational travel as well as in the initial position. As the sleeve 138 rotates within the cavity 70, a portion of the sleeve 138 slides against the ribs 86. The ribs 86 minimize the surface contact between the sleeve 138 and the saw housing 14 (i.e., the interior surface 78).

Upon engagement of the cam members 134, 154, continued rotation of the blade clamp actuator 18 causes rotation of the collar 126 of the blade clamp mechanism 38, also in the direction of arrow 192 of FIG. 8, thereby actuating the blade clamp mechanism 38 from a blade clamp or engage position to a blade release or disengage position (FIG. 7b). With the collar 126 in the disengaged position, the locking member 118 is able to move within the aperture 115 further out of the slot 110 to an unlocked position that allows the blade 34 to be removed. In the blade release position, a user may remove the saw blade 34 from the tool 10 either manually by the operator or automatically by the blade clamp mechanism 38, such as through an end 196 of the spring 127 (FIG. 9) that forces the blade 34 out of the slot 114. Once the saw blade 34 is removed, the user releases the lever 142 of the blade clamp actuator 18 such that the spring 146 biases the blade clamp actuator 18 and the blade clamp mechanism 38 back to the first or engaged position and the locking member 118 back to the locked position. As the sleeve 138 of the blade clamp actuator 18 rotates back toward the first position, the sleeve 138 may selectively engage the ribs 86 due to the slight pulling force on the sleeve 138.

In one embodiment, the user may rotate the blade clamp actuator 18 to allow the saw blade 34 to be inserted into the blade clamp mechanism 38. In another embodiment, the user may insert a saw blade 34 into the blade clamp mechanism 38 without rotating the blade clamp actuator 18. For example, the blade clamp mechanism 38 and blade clamp actuator 18 may be in the initial position prior to insertion of the saw blade 34. The blade clamp mechanism 38 may include a detent or other engagement mechanism that automatically receives the saw blade 34 in response to the user applied insertion force of the saw blade 34.

In one embodiment, the saw housing 14 includes a light, such as an LED, positioned proximate the forward portion 22 of the saw housing 14 to illuminate the saw blade 34 and a cutting area.

Although the invention has been described in detail with reference to certain preferred embodiments, variations and modifications exist within the scope and spirit of one or more independent aspects of the invention as described.

What is claimed is:

1. A reciprocating tool comprising:
a housing including a sidewall that defines a cavity;
a spindle mounted for reciprocating movement with respect to the housing within the cavity, the spindle including a longitudinal axis and an end configured to receive a saw blade;
a blade clamp mechanism actuator including a first member positioned within the cavity of the housing and a second member extending from the first member, the second member at least partially positioned outside the cavity, the blade clamp mechanism actuator coupled to the housing for movement with respect to the housing between a first position and a second position, wherein the spindle reciprocates with respect to the blade clamp mechanism actuator; and
a blade clamp mechanism coupled to the spindle for reciprocating movement therewith, the blade clamp mechanism configured to attach the saw blade to the spindle, the blade clamp mechanism including,
a collar mounted on the end of the spindle, the collar rotatable about the longitudinal axis of the spindle between an engaged position and a disengaged position in response to movement of the blade clamp mechanism actuator between the first position and the second position, wherein when the blade clamp mechanism actuator is in the first position, the collar is in the engaged position and is disengaged with the first member, and when the blade clamp mechanism actuator is in the second position, the collar is in the disengaged position and engaged with the first member, and
a locking member movable relative to the spindle between a locked position that attaches the saw blade to the spindle and an unlocked position that releases the saw blade from the spindle, wherein rotation of the collar from the disengaged position to the engaged position moves the locking member from the unlocked position to the locked position, and wherein rotation of the collar from the engaged position to the disengaged position allows the locking member to move from the locked position to the unlocked position.

2. The reciprocating tool of claim 1, wherein the housing includes an aperture that extends through the sidewall, and wherein the blade clamp mechanism actuator is accessible through the aperture.

3. The reciprocating tool of claim 2, wherein the second member of the blade clamp mechanism actuator includes a lever that extends through the aperture.

4. The reciprocating tool of claim 2, wherein the aperture is a first aperture, wherein the housing includes a second aperture configured to receive the saw blade.

5. The reciprocating tool of claim 2, wherein the aperture is arc shaped such that the aperture extends around a portion of the longitudinal axis of the spindle.

6. The reciprocating tool of claim 1, wherein the blade clamp mechanism actuator is rotatable about the longitudinal axis of the spindle from the first position to the second position.

7. The reciprocating tool of claim 1, wherein the blade clamp mechanism actuator further includes a sleeve that defines a cavity and a lever coupled to the sleeve, wherein the lever extends radially from the sleeve away from the cavity of the blade clamp mechanism actuator.

8. The reciprocating tool of claim 7, wherein the blade clamp mechanism is positioned within the sleeve of the blade clamp mechanism actuator.

9. The reciprocating tool of claim 7, wherein the collar defines a cavity and a cam member that extends radially away from the cavity of the collar, wherein the blade clamp mechanism actuator includes a cam member located within the cavity of the sleeve, wherein the cam member of the blade clamp mechanism actuator engages the cam member of the collar to rotate the collar from the engaged position to the disengaged position when the blade clamp mechanism actuator moves from the first position to the second position, and wherein the cam members of the blade clamp mechanism actuator and the collar disengage when the blade clamp mechanism actuator is in the first position to allow the collar to reciprocate with respect to the blade clamp mechanism actuator.

10. The reciprocating tool of claim 7, wherein the housing includes a first aperture extending through the sidewall, and the blade clamp mechanism actuator is accessible through the first aperture, wherein the housing includes a second aperture configured to receive the saw blade wherein the housing includes a rib that extends from the sidewall of the housing within the cavity of the housing and adjacent the second aperture, and wherein the sleeve contacts the rib.

11. The reciprocating tool of claim 1, wherein the blade clamp mechanism actuator is integrally formed as a single piece.

12. The reciprocating tool of claim 1, wherein a portion of the blade clamp mechanism actuator contacts the sidewall to limit movement of the blade clamp mechanism actuator toward the first position.

13. The reciprocating tool of claim 1, wherein the blade clamp mechanism actuator does not contact the collar when the collar is in the engaged position and the blade clamp mechanism actuator is in the first position.

14. The reciprocating tool of claim 1, further comprising a biasing member coupled to the housing and the blade clamp mechanism actuator to bias the blade clamp mechanism actuator toward the first position.

15. The reciprocating tool of claim 14, wherein the biasing member is a coil spring having a first hook that engages the housing and a second hook that engages the blade clamp mechanism actuator.

16. The reciprocating tool of claim 1, wherein the blade clamp mechanism includes a biasing member that biases the collar toward the engaged position.

17. The reciprocating tool of claim 1, wherein the blade clamp mechanism is entirely disposed within the cavity of the housing.

18. The reciprocating tool of claim 1, wherein the spindle includes a slot configured to receive the saw blade, an aperture positioned transverse to the slot, and wherein the locking member includes a pin movable within the aperture of the spindle from the unlocked position to the locked position in response to rotation of the collar from the disengaged position to the engaged position and movement of the blade clamp mechanism actuator from the second position to the first position.

19. The reciprocating tool of claim 1, wherein the housing defines a blade receiving end, the blade receiving end including a flange that extends inwardly from the sidewall to inhibit movement of the blade clamp mechanism actuator along the spindle.

20. The reciprocating tool of claim 1, wherein the blade clamp mechanism actuator contacts the housing to limit rotational movement of the blade clamp mechanism actuator about the longitudinal axis of the spindle and the blade clamp mechanism actuator contacts the housing to limit translational movement of the blade clamp mechanism actuator along the longitudinal axis of the spindle.

21. A blade clamp system for use with a reciprocating tool including a housing defining a cavity and a spindle mounted for reciprocating movement within the cavity and with respect to the housing, the spindle including an end configured to receive a saw blade, the blade clamp system comprising:
  an actuator including a first member adapted to be positioned within the cavity of the housing and a second member extending from the first member, the second member adapted to be at least partially positioned outside the cavity, the actuator adapted to be coupled to the housing for movement with respect to the housing between a first position and a second position, wherein the spindle reciprocates with respect to the actuator;
  a collar for mounting on the end of the spindle and selectively engaging the first member of the actuator, the collar adapted to be rotatable about the spindle between an engaged position and a disengaged position in response to movement of the actuator between the first position and the second position, wherein when the actuator is in the first position, the collar is in the engaged position and is disengaged with the first member, and when the actuator is in the second position, the collar is in the disengaged position and engaged with the first member; and
  a locking member adapted to be movable relative to the spindle between a locked position that attaches the saw blade to the spindle and an unlocked position that releases the saw blade from the spindle, wherein rotation of the collar from the disengaged position to the engaged position moves the locking member from the unlocked position to the locked position, and wherein rotation of the collar from the engaged position to the disengaged position allows the locking member to move from the locked position to the unlocked position.

22. The blade clamp system of claim 21, wherein the actuator is rotatable between the first and the second positions.

23. The blade clamp system of claim 22, wherein the actuator is adapted to rotate about the spindle between the first and the second positions.

24. The blade clamp system of claim 22, wherein the first member of the actuator comprises a sleeve that defines a cavity, and the second member of the actuator comprises a lever coupled to the sleeve and extending radially from the sleeve away from the cavity.

25. The blade clamp system of claim 24, wherein the collar is positioned within the sleeve.

26. The blade clamp system of claim 24, wherein the collar defines a cavity and includes a cam member extending radially away from the cavity of the collar, wherein the actuator includes a cam member located within the cavity of the sleeve, wherein the cam member of the actuator engages the cam member of the collar to rotate the collar from the engaged position to the disengaged position when the actuator moves from the first position to the second position, and wherein the cam members of the actuator and the collar disengage when the actuator is in the first position to allow the collar to reciprocate with respect to the actuator.

27. The blade clamp system of claim 21, wherein the actuator is integrally formed as a single piece.

28. The blade clamp system of claim 21, wherein the actuator does not contact the collar when the collar is in the engaged position and the actuator is in the first position.

29. The blade clamp system of claim 21, further comprising a biasing member that biases the actuator toward the first position.

30. The blade clamp system of claim 29, wherein the biasing member includes a coil spring having a first hook configured to engage the housing and a second hook that engages the actuator.

31. The blade clamp system of claim 21, further comprising a biasing member that biases the collar toward the engaged position.

* * * * *